July 14, 1931.  C. SIEMIANA  1,813,967
BEET HARVESTER
Filed March 14, 1927   3 Sheets-Sheet 1
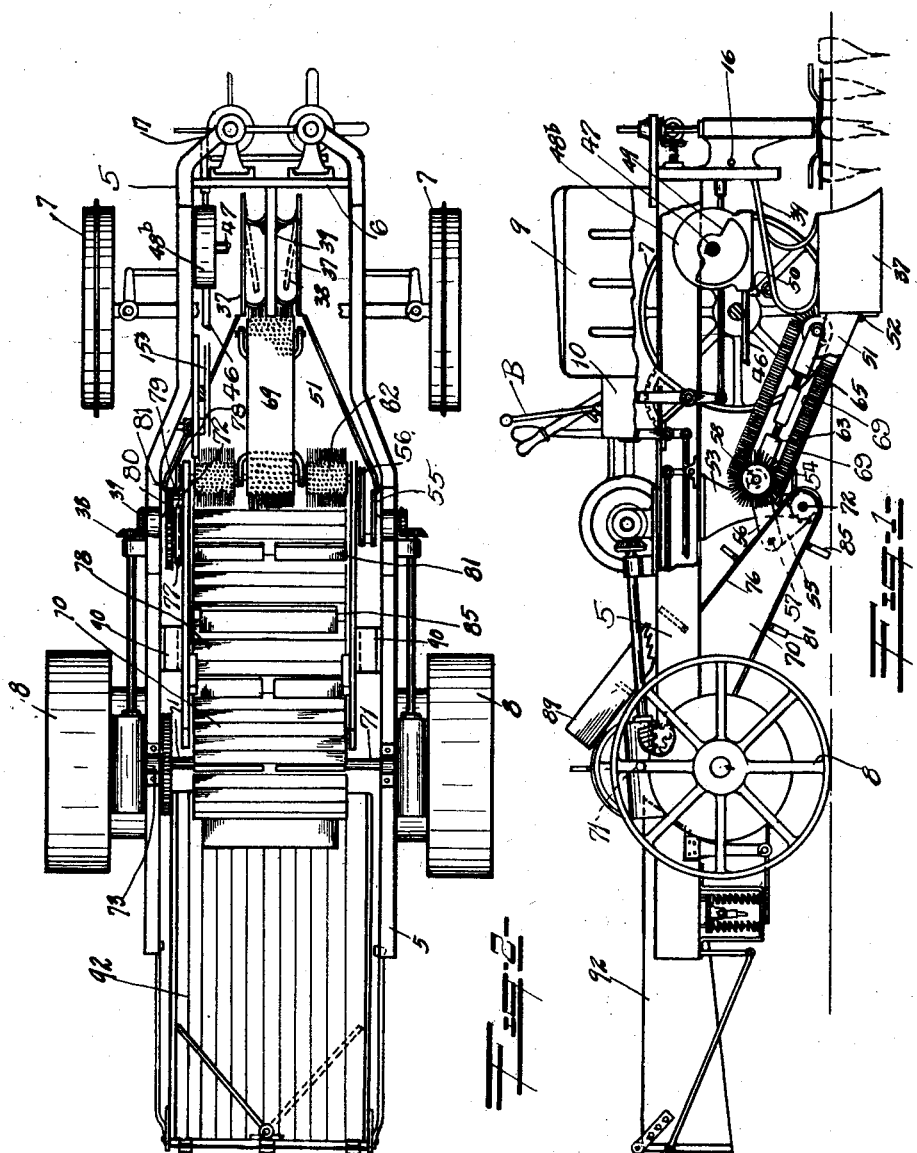
INVENTOR.
Casimir Siemiana
BY
Frank C. Karman
ATTORNEY.

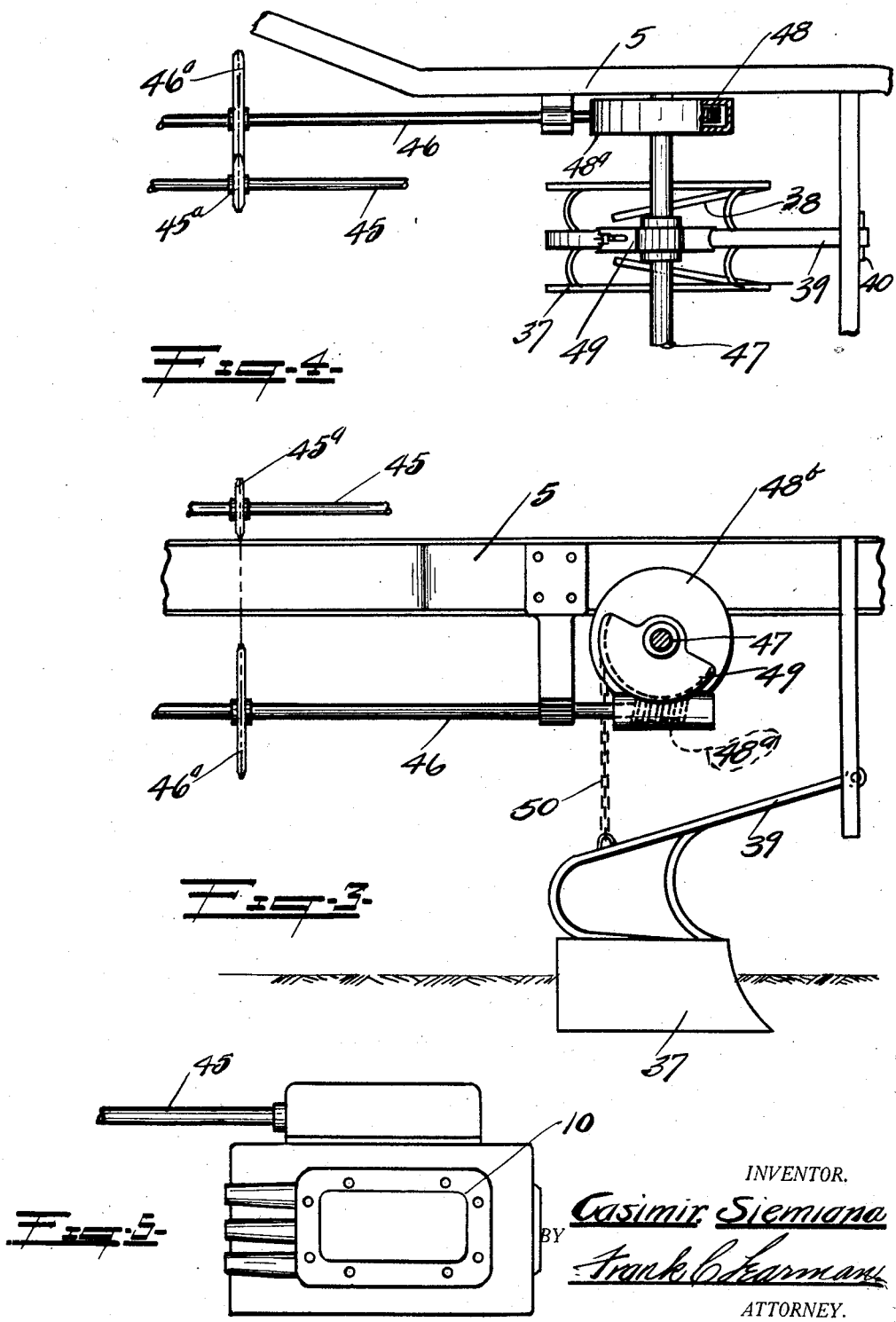

July 14, 1931.  C. SIEMIANA  1,813,967
BEET HARVESTER
Filed March 14, 1927    3 Sheets-Sheet 3
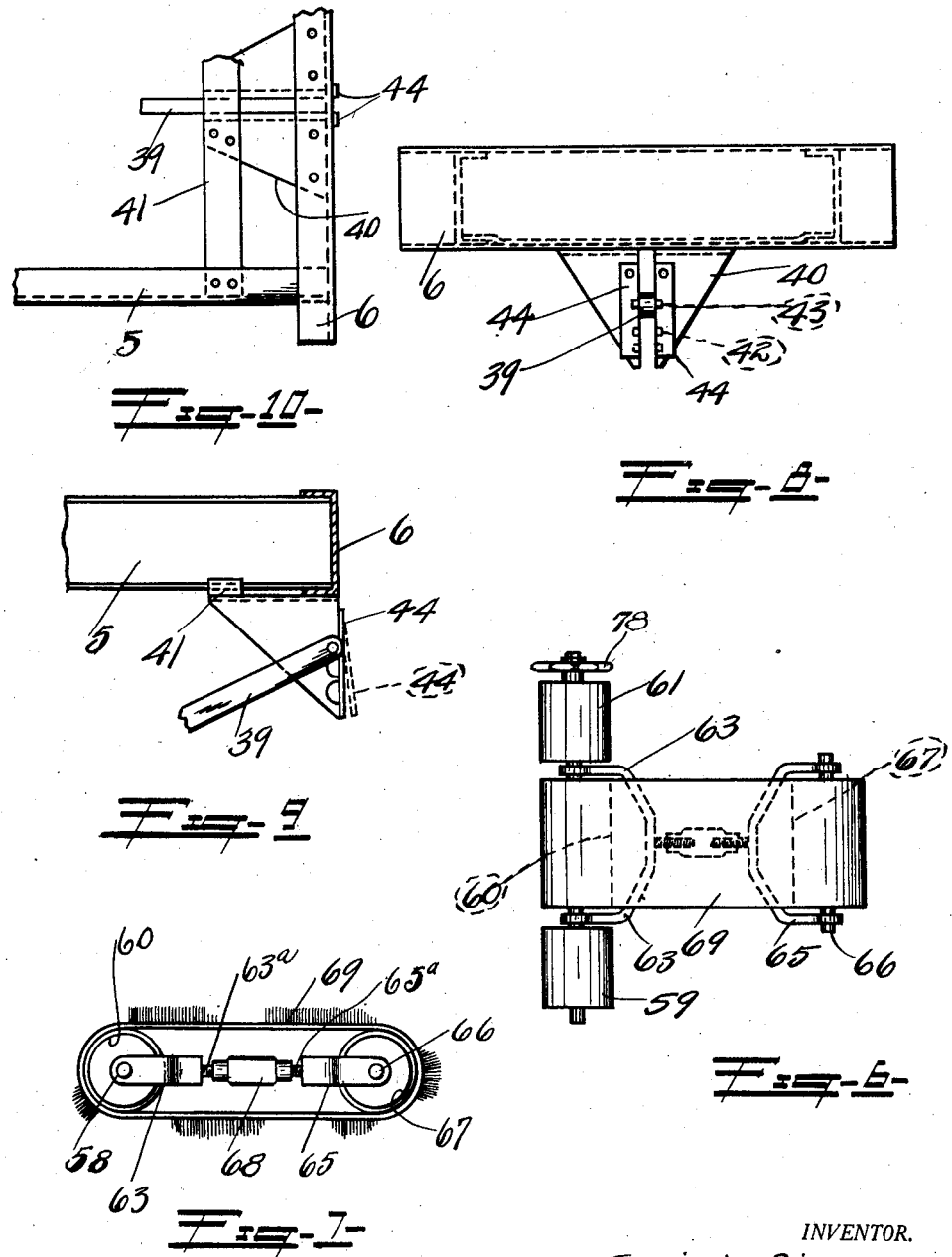

Patented July 14, 1931

1,813,967

UNITED STATES PATENT OFFICE

CASIMIR SIEMIANA, OF BAY CITY, MICHIGAN

BEET HARVESTER

Application filed March 14, 1927. Serial No. 175,052.

This invention relates to harvesting machines and the like, and particularly to a machine for harvesting beets.

One object of the invention is to design a machine which will lift, and convey the roots into a hopper from which they are dumped in heaps or piles of certain size or weight.

A further object is to design a simple, substantial and economical harvester which will automatically clean the roots as they are being conveyed to the hopper.

Another object is to provide automatic means whereby the hopper will be automatically dumped when a certain predetermined weight of beets has been deposited therein.

A further object still is to design a machine in which the lifting, topping and depositing of the roots in piles is accomplished mechanically, eliminating the disagreeable hand labor necessary at the present time, and which must ofttimes be performed at the season of the year when the weather is cold and wet.

With the above and other objects in view, the present invention consists in the combination and arrangement of parts, hereinafter more fully described, illustrated in the accompanying drawings, and particularly pointed out in the appended claims, it being understood that changes may be made in the form, size, proportion and minor details of construction without departing from the spirit or sacrificing any of the advantages of the invention.

In the drawings:

Fig. 1 is a part sectional side view of my improved harvester, parts being broken away to show the various lifting, digging and conveying mechanisms.

Fig. 2 is a top plan view, the transmission and motor being eliminated.

Fig. 3 is an enlarged detail side view of the mechanism for automatically adjusting the height of the lifting means.

Fig. 4 is a top plan view thereof.

Fig. 5 is a fragmentary plan view of the transmission showing the power take-off extension shaft.

Fig. 6 is a top plan view of the belt brush with the bristles omitted.

Fig. 7 is a side view thereof.

Fig. 8 is a fragmentary front view of the frame and the attachment for the puller draw bar.

Fig. 9 is a sectional edge view.

Fig. 10 is a top plan view.

Referring now particularly to the drawings in which I have shown the preferred embodiment of my invention, the harvester comprises a frame 5 preferably formed of channel iron, and suitably braced by means of spaced apart cross members 6 riveted or otherwise secured to the frame. Front and rear wheels 7 and 8 respectively support this frame in the usual manner, and the machine and mechanism is driven by a power plant 9 mounted on the frame in the usual manner, and connected to a standard transmission 10, which is in turn connected to the lifting mechanism in a manner to be presently described, and I shall not describe the power plant, transmission or differential in detail as these can be of the standard type, and form no part of the present invention.

The topping mechanism, located at the front of the machine, forms no part of the present invention and will not be described in detail.

The digging mechanism comprises sheet metal side walls 37 to which the conventional lifting forks 38 are secured, a draw bar 39 being connected to said lifter and pivotally secured to a pair of spaced apart angles 40 which depend from the cross braces 41 and 6. Notches or sockets 42 are provided in the angles 40, and a pin 43 is seated in the end of the draw bar, the ends of the pins engaging and being seated in said notches, resilient metal strips 44 are bolted to said angles, and serve to hold the pin in the sockets, the depth and angle of said lifting means being changed by springing said strips outwardly as shown in dotted lines in Fig. 9 so that the pin can be disengaged and inserted in one of the other sockets.

The raising and lowering of the digging mechanism is controlled from the motor, and comprises a power take-off extension shaft 45 on which a sprocket 45ª is mounted, said sprocket being connected to a similar sprocket 46ª, which is mounted on the longitudinally disposed shaft 46, by means of the conventional sprocket chain.

A transversely disposed shaft 47 is journaled in suitable bearings secured to the underside of the frame, and a worm wheel 48 is keyed thereon, said wheel being driven by a worm 48ª which is mounted on the end of the shaft 46, and a suitable housing 48ᵇ encloses said worm and worm wheel.

A cam shaped member 49 is mounted on the shaft 47 and one end of a chain 50 is anchored thereto, the opposite end being anchored to the lifter bar 39, all as clearly shown in Figs. 3 and 4 of the drawings, and it will be clearly obvious that by manipulation of the conventional gear shift lever "B" in the usual manner the rotation of the shaft 47 will wind the chain on the member 49, the gear reduction of the power lift being such that the raise will be reasonably slow.

One end of a metal trough 51 is hingedly connected to the end of the lifter side walls at the point 52, the opposite end being connected to depending brackets 53 secured to the frame side members, the bracket 53 being slotted as shown at 54 to permit the necessary movement as the lifter is raised or lowered.

Each bracket 53 has an offset leg 55 cast integral therewith, and links 56 are pivotally connected to the free end thereof by means of bolts 57, a shaft 58 being journaled in the opposite ends of said links, and spaced apart rollers 59, 60 and 61 are mounted thereon, the rollers 59 and 61 being covered with a belt 62 which is provided with bristles as shown.

A yoke 63 is loosely journaled on the shaft 58, and a threaded shaft 63ª is formed integral therewith, a similar yoke 65 being mounted on a shaft 66 and on which the roller 67 is mounted, the end 65ª having a left hand thread, these threaded ends engaging a turn buckle 68, manipulation of which provides for adjustment. A bristled belt 69 is trained over the rollers 60 and 67, and is driven in a manner to be presently described. I wish however to direct particular attention to the fact that the lower end of the frame and belt 69 float in the trough and are free to raise and lower as the roots are carried along to the inclined conveyor 70 which is secured in the frame in the rear of the belt.

The conveyor 70 which is operatively connected in any suitable manner with power plant 9 comprises spaced apart shafts 71 and 72, the shaft 71 being journaled in bearings 73 which are secured to the frame, the shaft 72 being journaled in suitable bearings provided in the brackets 53.

A beet hopper 92 is mounted in the frame directly behind the conveyor and the conveyor discharges thereinto, said hopper being dumped in any approved manner.

A sprocket 77 is mounted on one end of the bolt 57 and is geared to a similar sprocket 78 which is mounted on the shaft 58 by means of a chain 79, a spur gear 80 being also mounted on the bolt 57 meshing with and driving a gear 81 which is mounted on the shaft 72, this arrangement furnishing a drive for the rollers 59, 60 and 61.

All control levers are located in close proximity to the operator's seat, so that but one person is required for operation of the machine.

From the foregoing description it will be obvious that I have perfected a very simple, efficient and substantial beet harvester which will top, lift and deposit the beets in piles of any predetermined size.

What I claim is:—

1. In a beet harvester, the combination of a frame, a beet lifting mechanism supported by the frame, a trough in the rear of said lifting mechanism and hingedly connected to the rear end thereof, and adapted to receive the beets, and a conveyor floating in said trough and adapted to deliver the beets to a second conveyor for elevating them to a hopper.

2. In a beet harvester, the combination with a frame, a beet lifting mechanism connected to and supported by said frame, a trough in the rear of said lifting mechanism and hingedly connected to the rear end thereof and adapted to receive the beets, a conveyor floating in said trough and discharging onto a second conveyor, and means for driving said conveyors.

3. In a beet harvesting machine, the combination of a frame, beet lifting means pivotally connected thereto, a trough in the rear of said lifting mechanism and hingedly connected to the rear end thereof and adapted to receive the beets, a bristled belt conveyor mounted to float therein and discharging onto a second conveyor, means for driving said conveyors, and means for raising said lifting means.

4. In a beet harvesting machine, the combination with a frame, beet lifting means connected thereto, an inclined trough in the rear of the lifting mechanism and hingedly connected to the lifting means and the frame, and adapted to receive the beets, a bristled belt conveyor pivotally connected to the frame and floating in said trough and adapted to deliver the beets to a second conveyor, means for driving said conveyors, and means for vertically adjusting said lifting means.

5. In a beet harvester, the combination with a wheeled frame, a beet lifting mechanism connected to the front end thereof, an inclined trough in the rear of the lifting means, and hingedly connected to the rear end thereof and adapted to receive the beets, a bristled conveyor pivotally mounted on the frame and floating in said trough, said conveyor discharging onto a second conveyor, means for driving said conveyors, and means for adjusting the height of said lifting means.

In testimony whereof I hereunto affix my signature.

CASIMIR SIEMIANA.